(12) United States Patent
Khatib et al.

(10) Patent No.: US 11,009,931 B2
(45) Date of Patent: May 18, 2021

(54) VOLTAGE ASSESSMENT PREDICTION SYSTEM FOR LOAD/GENERATION SHEDDING

(71) Applicant: Schweitzer Engineering Laboratories, Inc., Pullman, WA (US)

(72) Inventors: Abdel Rahman Khatib, Pullman, WA (US); Niannian Cai, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 165 days.

(21) Appl. No.: 16/284,882

(22) Filed: Feb. 25, 2019

(65) Prior Publication Data

US 2020/0026337 A1 Jan. 23, 2020

Related U.S. Application Data

(60) Provisional application No. 62/699,594, filed on Jul. 17, 2018.

(51) Int. Cl.
*G06F 1/26* (2006.01)
*H02J 3/14* (2006.01)
(Continued)

(52) U.S. Cl.
CPC ............... *G06F 1/266* (2013.01); *H02J 3/14* (2013.01); *H02J 3/381* (2013.01); *H02J 13/0006* (2013.01); *H02J 2203/20* (2020.01)

(58) Field of Classification Search
CPC ............... G06F 1/3206; G06F 11/3466; G06F 2212/1028; G06F 30/27; G05B 15/02; G05B 17/02; G05B 2219/2639
(Continued)

(56) References Cited

U.S. PATENT DOCUMENTS

| | | |
|---|---|---|
| 3,849,637 A | 11/1974 | Caruso |
| 4,916,328 A | 4/1990 | Culp |

(Continued)

FOREIGN PATENT DOCUMENTS

| | | |
|---|---|---|
| CN | 101545953 | 1/2011 |
| DE | 10200733 | 7/2003 |
| EP | 1381132 | 9/2010 |

OTHER PUBLICATIONS

R. Mageshvaran and T. Jayabarathi, "GSO based optimization of steady state load shedding in power systems to mitigate blackout during generation contingencies," Ain Shams Engineering Journal, vol. 6, No. 1, pp. 145-160, Mar. 2015.
(Continued)

*Primary Examiner* — Michael J Brown
(74) *Attorney, Agent, or Firm* — Bradley W. Schield (57) ABSTRACT

The present disclosure relates to systems and methods of predicting voltages for various contingencies. For example, a monitoring system may include a processor that acquires at least one contingency of an electric power delivery system. The processor may acquire an expected control action based on the at least one contingency from controllers/IEDs. The processor may predict a voltage of at least one bus of the electric power delivery system by simulating the change in the state of the electric power delivery system caused by the expected control action. The processor may determine that the voltage of the at least one bus is predicted to violate one or more operational settings of the electric power delivery system if the at least one contingency were to occur. The processor may provide an indication that the voltage violates the one or more operational settings on a display of the electronic device.

25 Claims, 5 Drawing Sheets

(51) Int. Cl.
*H02J 13/00* (2006.01)
*H02J 3/38* (2006.01)
*G06F 1/32* (2019.01)
*G06F 30/27* (2020.01)
*G05B 17/02* (2006.01)
*G05B 15/02* (2006.01)

(58) Field of Classification Search
USPC .......................................................... 700/297
See application file for complete search history.

(56) References Cited

U.S. PATENT DOCUMENTS

| | | | |
|---|---|---|---|
| 5,436,510 | A | 7/1995 | Gilbert |
| 6,204,642 | B1 | 3/2001 | Lawson |
| 6,492,801 | B1 | 12/2002 | Sims |
| 6,608,635 | B1 | 8/2003 | Mumm |
| 7,698,233 | B1 | 4/2010 | Edwards |
| 8,131,383 | B2 | 3/2012 | Pearson |
| 8,248,060 | B2 | 8/2012 | Schweitzer |
| 8,604,803 | B2 | 12/2013 | Dooley |
| 8,606,372 | B1 | 12/2013 | Harris |
| 9,519,301 | B2 | 12/2016 | Bartlett |
| 2002/0091503 | A1 | 7/2002 | Carrillo |
| 2003/0042876 | A1 | 3/2003 | Sadafumi |
| 2003/0088809 | A1 | 5/2003 | Gulati |
| 2004/0164717 | A1 | 8/2004 | Thompson |
| 2005/0285574 | A1 | 12/2005 | Huff |
| 2007/0162189 | A1 | 7/2007 | Huff |
| 2007/0168088 | A1 | 7/2007 | Ewing |
| 2007/0219755 | A1 | 9/2007 | Williams |
| 2007/0239372 | A1 | 10/2007 | Schweitzer |
| 2007/0239373 | A1* | 10/2007 | Nasle .................... G06N 20/00 702/58 |
| 2008/0074810 | A1 | 3/2008 | Guzman-Casillas |
| 2009/0085407 | A1 | 4/2009 | Venkatasubramanian |
| 2010/0312414 | A1 | 12/2010 | Kumar |
| 2011/0004425 | A1 | 1/2011 | Schweitzer |
| 2011/0022245 | A1 | 1/2011 | Goodrum |
| 2011/0054709 | A1 | 3/2011 | Son |
| 2011/0320058 | A1 | 12/2011 | Rietmann |
| 2012/0123602 | A1 | 5/2012 | Sun |
| 2012/0232710 | A1 | 9/2012 | Warner |
| 2012/0310434 | A1 | 12/2012 | Taft |
| 2012/0310559 | A1 | 12/2012 | Taft |
| 2013/0035885 | A1 | 2/2013 | Sharon |
| 2013/0074513 | A1 | 3/2013 | Mueller |
| 2013/0166085 | A1 | 6/2013 | Cherian |
| 2013/0191052 | A1* | 7/2013 | Fernandez .............. G06F 17/00 702/60 |
| 2014/0001847 | A1 | 1/2014 | Khandelwal |
| 2014/0100705 | A1 | 4/2014 | Shi |
| 2015/0077133 | A1 | 3/2015 | Fischer |
| 2015/0241894 | A1 | 8/2015 | Bartlett |
| 2015/0244170 | A1 | 8/2015 | Bartlett |
| 2015/0244171 | A1 | 8/2015 | Bartlett |
| 2018/0034317 | A1 | 2/2018 | Khatib |
| 2018/0247001 | A1* | 8/2018 | Liu ........................ G06F 30/367 |

OTHER PUBLICATIONS

F. Sayed, S. Kamel and O. Abdel-Rahim, "Load shedding solution using multi-objective teaching-learning-based optimization," 2018 International Conference on Innovative Trends in Computer Engineering (ITCE), Aswan, 2018, pp. 447-452.

R. M. Larik, M. W. Mustafa, A. O. Otuoze, O. O. Mohammed and A. H. Sule, "A new technique of load shedding to stabilize voltage magnitude and fast voltage stability index by using hybrid optimization," ARPN Journal of Engineering and Applied Sciences, vol. 13, No. 8, pp. 2734-2745, Apr. 2018.

H. Gao, Y. Chen, Y. Xu, and C.-C. Liu, "Dynamic load shedding for an islanded microgrid with limited generation resources," IET Generation, Transmission & Distribution, vol. 10, No. 12, pp. 2953-2961, May 2016.

S. S. Reddy, "Multi-Objective Based Congestion Management Using Generation Rescheduling and Load Shedding," in IEEE Transactions on Power Systems, vol. 32, No. 2, pp. 852-863, Mar. 2017.

Abdel Rahman Khatib, Mahipathi Appannagari, Scott Manson, and Spencer Goodall; "Load Modeling Assumptions: What is Accurate Enough?" 62nd Annual Petroleum and Chemical Industry Technical Conference, Houston, TX Oct. 5-7, 2015.

POWERMAX® Solutions: Power Management Systems for Industries Remedial Action Schemes for Utilities; Schweitzer Engineering Laboratories, Inc. Mar. 20, 2017.

SEL POWERMAX® Power Management for Industrials; Schweitzer Engineering Laboratories, Inc. Aug. 13, 2018.

SEL POWERMAX® Guideform Specification; Schweitzer Engineering Laboratories, Inc. Feb. 21, 2012.

Kai Sun, Da-Zheng Zheng, and Qiang Lu, "Splitting Strategies for Islanding Operation of Large-Scale Power Systems Using OBDD-based methods," in IEEE Transactions on Power Systems, vol. 18, No. 2, pp. 912-923, May 2003.

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

* cited by examiner

| Contingency | Breaker(s) | Bus connection | Voltage assessment |
|---|---|---|---|
| C1 | A | Bus 1 | Ok |
| C2 | B | Bus 2 | Ok |
| C3 | C | Bus 3 | Ok |
| C4 | D | Bus 4 | Ok |
| C5 | 162, 164 | Bus 5 | Voltage Violation |

Contingency C5

| Bus | Voltage | Operating Range |
|---|---|---|
| Bus 1 | 50kV | 50-60kV |
| Bus 2 | 20kV | 50-60kV |
| Bus 3 | 30kV | 30-40kV |

FIG. 4 under this patent office rule

VOLTAGE ASSESSMENT PREDICTION SYSTEM FOR LOAD/GENERATION SHEDDING

RELATED APPLICATIONS

This application claims priority under 35 U.S.C. § 119 to U.S. Provisional Patent Application No. 62/699,594 filed on Jul. 17, 2018, titled "Voltage Assessment Prediction System for Load/Generation Shedding," which is hereby incorporated by reference in its entirety.

TECHNICAL FIELD

The present disclosure relates generally to power systems and, more particularly, to predicting characteristics of a power system based on contingencies.

BRIEF DESCRIPTION OF THE DRAWINGS

This disclosure includes illustrative embodiments that are non-limiting and non-exhaustive. Reference is made to certain of such illustrative embodiments that are depicted in the figures described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to transmit electric power from generation to load. Electric power delivery control and monitoring systems may be used to monitor the power being delivered and to make decisions regarding such electric power delivery systems. For example, electric power delivery control and monitoring systems may take one or more control actions based on a contingency that may occur in the system. A contingency may refer to an event that has not yet occurred on the electric power delivery system that may affect the electric power delivery system if the event occurs. For example, a contingency may refer to loss and/or failure of equipment on the electric power delivery system, an overcurrent, undercurrent, overvoltage, or undervoltage on the electric power delivery system, or the like. These contingencies may be caused by faults, generator failure, transformer failure, or any other event on the power delivery system. In some cases, the contingency may impact the power being generated and/or the power being demanded. To account for the contingency occurring on the power delivery system, electric power delivery control and monitoring systems may perform control action(s), such as shedding loads and/or shedding power generation, to balance power generation with power demand upon occurrence of the contingency to maintain operation of the electric power delivery system.

Conventionally, decisions to shed load and/or shed power generation may be made based on real power being delivered or the frequency of the current/voltage. For example, if real power being generated and delivered to the loads does not meet the real power demands of the loads, one or more loads may be shed from the electric power delivery system to balance the real power being generated with the real power being demanded by the remaining loads.

However, making these decisions based on real power alone may result in voltage variations on the power delivery system due to changes in reactive power. For example, shedding a generator to balance the real power being generated with the real power being demanded may cause an excess/deficiency in reactive power. Further, the extent of the difference between the reactive power supply and reactive power demand in control systems that monitor real power may not be known. This difference (e.g., excess or deficiency) between reactive power supplied and reactive power demanded may cause undesirable voltage behaviors. For instance, by not accounting for reactive power on the electric power delivery system, voltages on one or more buses in the power delivery system may decrease below a desired operating limit due to a difference between reactive power being demanded and reactive power being delivered. Depending on the extent of the difference (e.g., deficiency/excess) between reactive power supply and reactive power demand, various bus voltages of the electric power delivery system may decrease or increase beyond desired operating limits, voltage protection trips may occur, and/or voltage collapses may occur. As such, these events may result in outages on the power system.

As described below, a voltage assessment prediction system may determine predicted voltages of each bus in the power delivery system for each contingency in a set of contingencies if the contingency were to occur. The control action(s) taken due to the contingencies may cause load shedding and/or generation shedding on the electric power delivery system which result in a change of the state of the electric power delivery system. The change in the state of the electric power delivery system may cause changes in the reactive power generation and/or reactive power demand. Decreasing supply of reactive power with respect to the demand may cause the voltage on one or more buses of the electric power delivery system to decrease while increasing the supply of reactive power with respect to the demand may cause the voltage on one or more buses to rise.

Figure 1:
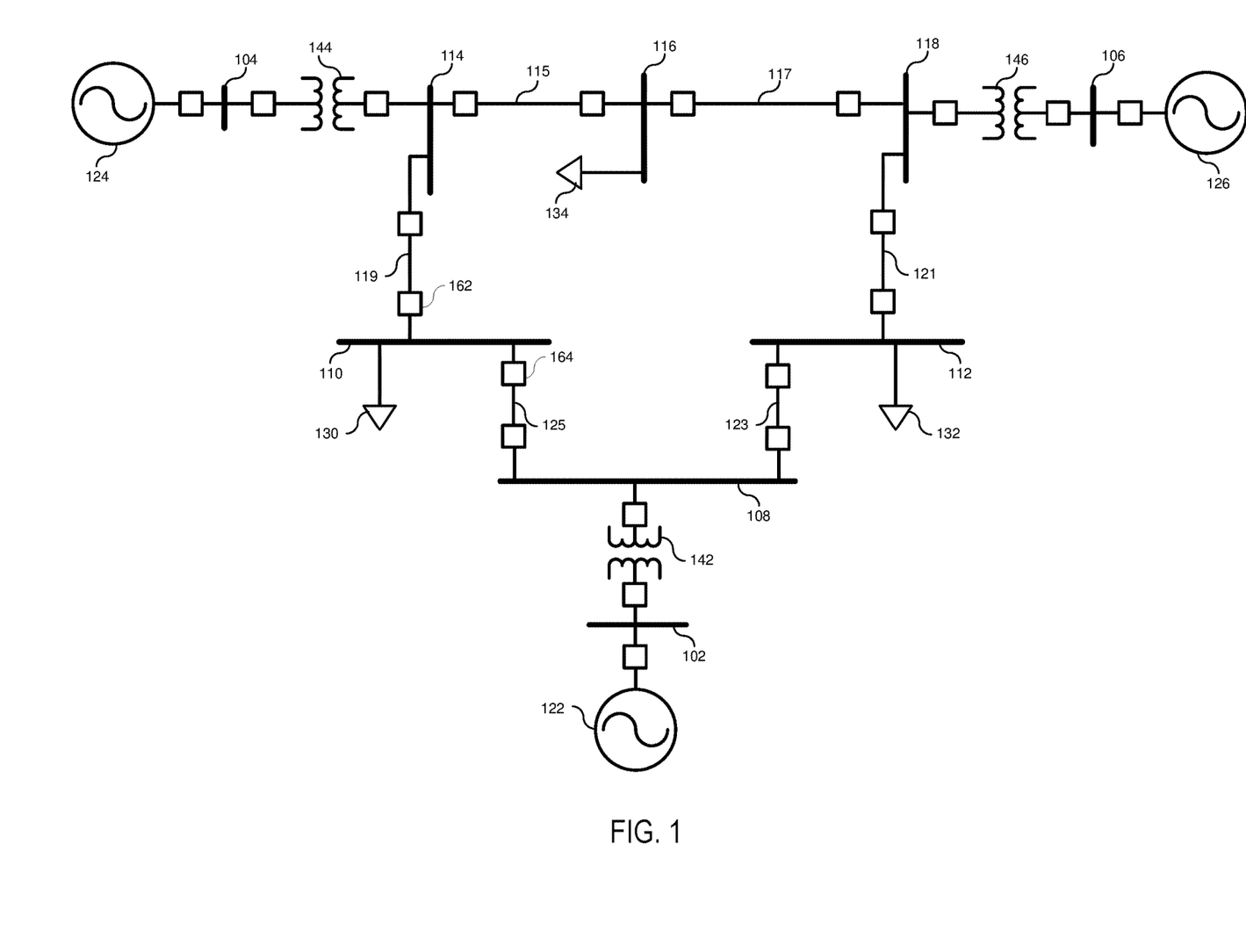
FIG. 1 illustrates an embodiment of a simplified one-line diagram of an electric power delivery system.

FIG. 1 illustrates a simplified one-line diagram of an electric power delivery system 100, according to one embodiment. The illustrated diagram is similar to the IEEE 9-bus system. The system includes a first bus 102 in electrical communication with a first generator 122, which is in electrical communication with a fourth bus 108 through a first transformer 142. A second generator 124 is in electrical communication with a second bus 104, which is in electrical communication with a seventh bus 114 through a second transformer 144. A third generator 126 is in electrical connection with a third bus 106, which is in electrical communication with a ninth bus 118 through a third transformer 146. The seventh bus 114 is in electrical communication with the ninth bus 118 via the eighth bus 116 and transmission lines 115 and 117. The seventh bus 114 is in electrical communication with a fifth bus 110 via transmission line 119. The ninth bus 118 is in electrical communication with sixth bus 112 via transmission line 121. Both the ninth bus 118 and the sixth bus 112 are in electrical communication with the fourth bus 108 via the transmission line 123. The fifth bus 110 is in electrical communication with a first load 130. The fifth bus 110 is in electrical communication with the fourth bus via the transmission line 125 The sixth bus 112 is in electrical communication with a second load 132. The eighth bus 116 is in electrical communication with a third load 134.

For ease of discussion in the voltage assessment prediction described hereunder, Table A shows the translation of the element numbers illustrated in FIG. 1 and the element names according to the IEEE 9-bus system:

TABLE A

| FIG. 1 Element Number | IEEE 9-Bus System Elements |
| --- | --- |
| 102 | Bus 1 |
| 104 | Bus 2 |
| 106 | Bus 3 |
| 108 | Bus 4 |
| 110 | Bus 5 |
| 112 | Bus 6 |
| 114 | Bus 7 |
| 116 | Bus 8 |
| 118 | Bus 9 |
| 122 | Generator 1 |
| 124 | Generator 2 |
| 126 | Generator 3 |
| 130 | Load A |
| 132 | Load B |
| 134 | Load C |
| 142 | Transformer 1 |
| 144 | Transformer 2 |
| 146 | Transformer 3 |

The simplified electric power system illustrated in FIG. 1 may be an islanded system, such as an industrial system or a microgrid. In such an embodiment, the generators 122, 124, and 126 provide electric power to loads 130, 132, and 134. As discussed below, a contingency may involve, for example, an overcurrent on the fifth bus 110. In this example, if the contingency were to occur, power control and monitoring systems may perform a control action by sending control signal(s) to one or more intelligent electronic devices (IEDs) to open breakers 162 and 164 to shed load 130.

Various embodiments of the universal power flow algorithms may be used to monitor any suitable power system, such as systems similar to that illustrated in FIG. 1. It is appreciated that the systems and methods described herein may be applied as described and/or with adaptation to a wide variety of electrical system configurations, including but not limited to microgrids, industrial facilities, oil platforms, etc. As explained below, a monitoring system 182 may used to determine whether voltages on buses of the power delivery system 100 are predicted to violate operational settings of the power delivery system 100 under various operating conditions.

Figure 2:
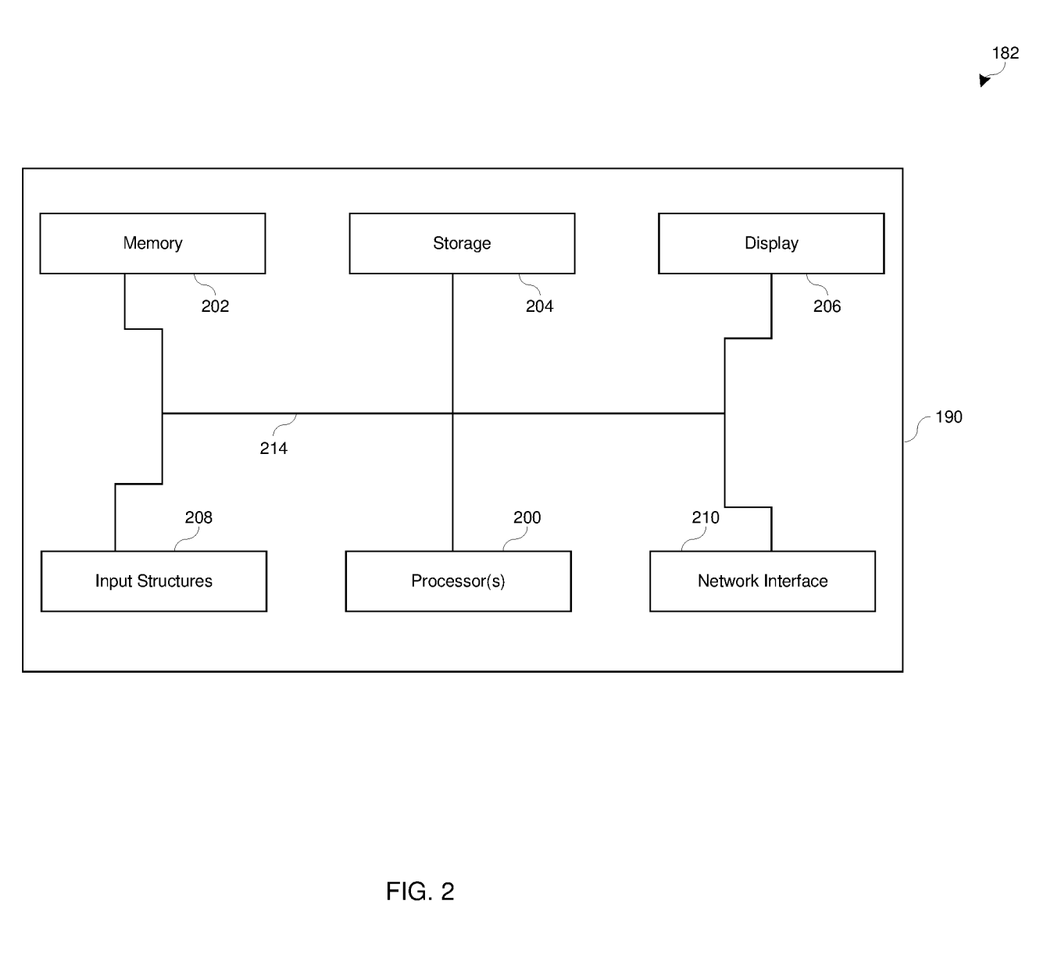
FIG. 2 illustrates a block diagram of a monitoring system that monitors the electric power delivery system of FIG. 1, in accordance with an embodiment.

FIG. 2 is a block diagram of the monitoring system 182 that may be used to monitor the electric power delivery system 100, including the power generator 122. The monitoring system 182 may be located at any suitable location, such as at a power plant of the power generator 122. The monitoring system 182 may include one or more electronic device(s) 190 according to an embodiment of the present disclosure, which may include, among other things, one or more processor(s) 200, memory 202, nonvolatile storage 204, a display 206, input structures 208, and communication circuitry 210. The various functional blocks shown in FIG. 2 may include hardware elements (including circuitry), software elements (including computer code stored on a computer-readable medium) or a combination of both hardware and software elements. It should be noted that FIG. 2 is merely one example of a particular implementation and is intended to illustrate the types of components that may be present in the electronic device 190. The processor may be a single contained processing module or may be incorporated wholly or partially within any of the other elements within the electronic device 190.

In the electronic device 190 of FIG. 2, the processor 200 may be operably coupled, via one or more communication buses 214, with the memory 202 and the nonvolatile storage 204 to perform various algorithms. Such programs or instructions executed by the processor 200 may be stored in any suitable article of manufacture that includes one or more tangible, computer-readable media at least collectively storing the instructions or routines, such as the memory 202 and the nonvolatile storage 204. The memory 202 and the nonvolatile storage 204 may include any suitable articles of manufacture for storing data and executable instructions, such as random-access memory, read-only memory, rewritable flash memory, hard drives, and optical discs. In some embodiments, the nonvolatile storage 204 and/or the processor 200 may all be implemented as hardware components, such as via discrete electrical components, via a field programmable gate array (FPGA), and/or via one or more application specific integrated circuits (ASICs). Further, the instructions or routines may be provided to the processor 200 to produce a machine, such that the instructions, when executed by the processor 200, implement the operations/acts specified in the flowchart described below with respect to FIGS. 3A and 3B.

The input structures 208 of the electronic device 190 may enable a user to interact with the electronic device 190 (e.g., activating a control action) via the display 206. The display 206 may be any suitable display that allows users to view images generated on the electronic device 190, such as a liquid crystal display (LCD), organic light emitting diode (OLED) display, or the like.

According to various embodiments, the monitoring system 182 may comprise one or more of a variety of types of systems. For example, central monitoring system 182 may include a supervisory control and data acquisition (SCADA) system and/or a wide area control and situational awareness (WACSA) system. The monitoring system 182 may provide protective operations for the power delivery system 100. In some embodiments, intelligent electronic devices (IEDs) may be in communication with the monitoring system 182. The IEDs may communicate over various media such as a direct communication or over a wide-area communications network. The network interface 210 may include, for example, communication circuitry to communicate wirelessly with the IEDs. The monitoring system 182 may receive signal(s) from one or more of the power generators 122, 124, and 126, one or more of the loads 130, 132, and 134, and/or one or more other electronic devices, such as one or more IEDs, on the power delivery system 100. As explained below, the processor 200 may predict voltages of the electric power delivery system 100 based on the state of the power delivery system if a contingency in the electric power delivery system 100 were to occur.

Figure 3A:
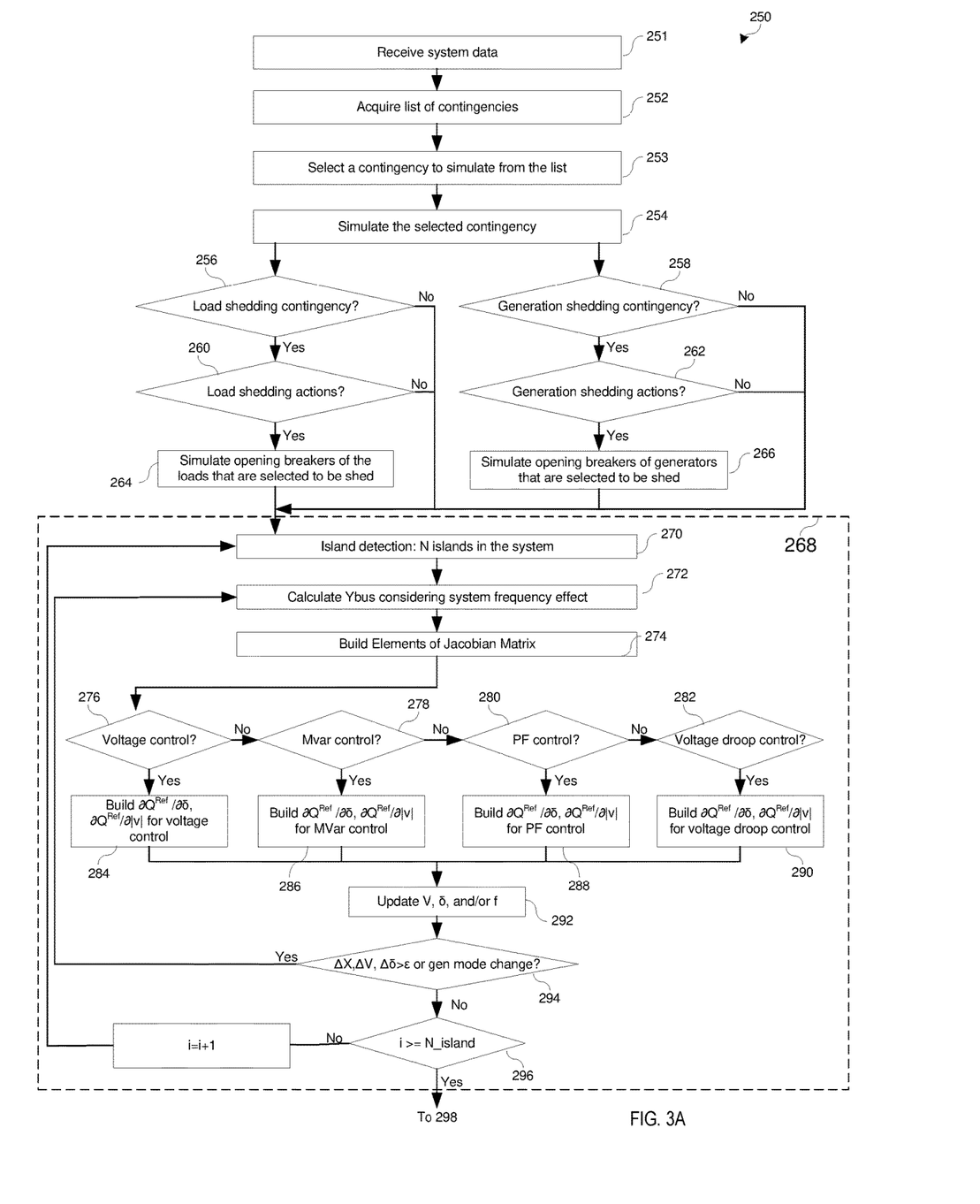
FIGS. 3A and 3B illustrate a flow chart of a process performed by the monitoring system of FIG. 2, in accordance with an embodiment.
Figure 3B:
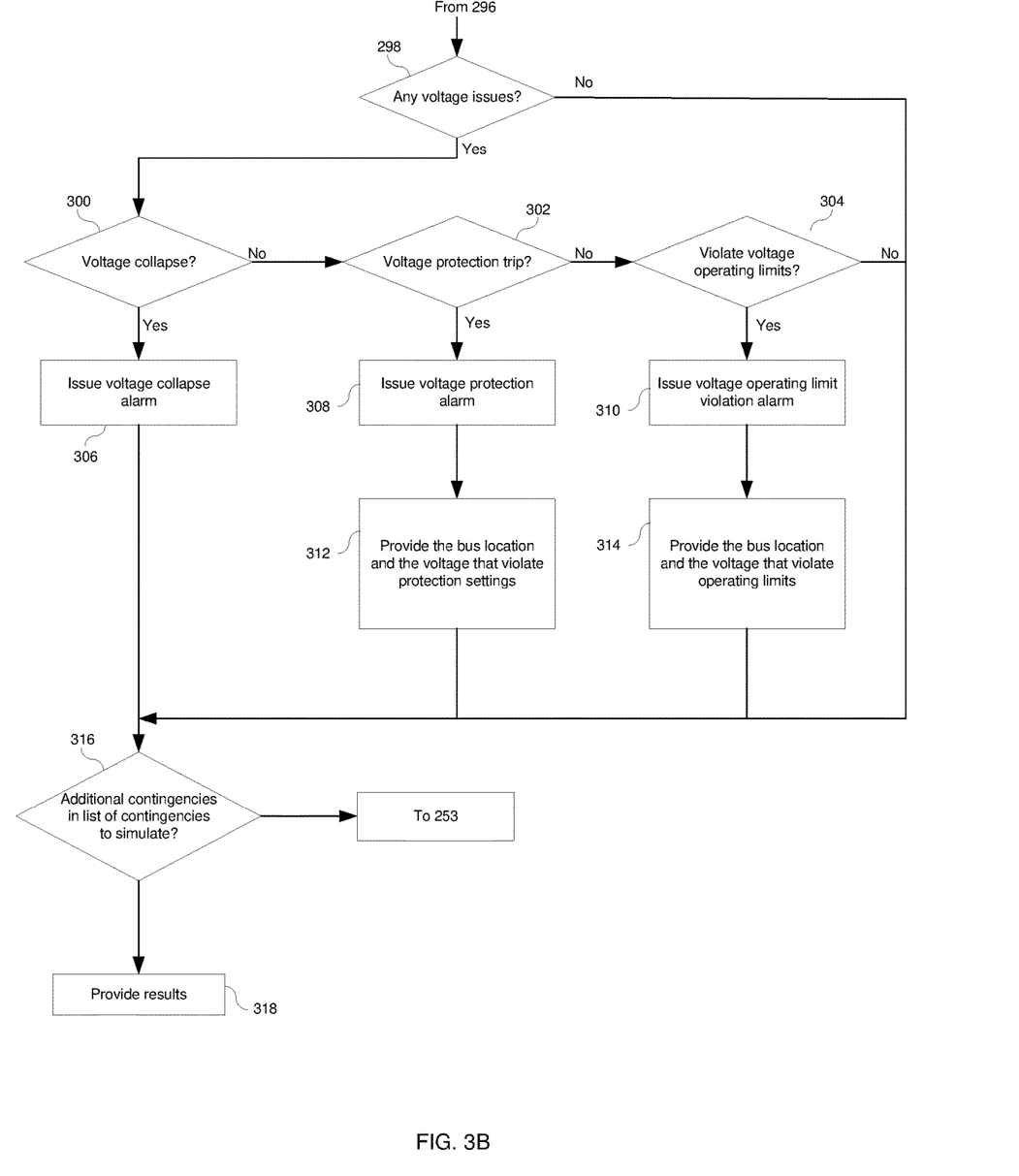

FIGS. 3A and 3B illustrate a flowchart of a process 250 performed by the monitoring system 182 to determine voltages of the power delivery system 100. The process 250 may be stored as instructions (e.g., code) on the memory 202 and/or the computer-readable storage medium 204 to be executed by the processor 200 to cause the processor 200 to perform the steps described herein. The processor 200 may receive one or more system inputs (block 251). For example, the processor 200 may obtain data similar to the information included in the one-line diagram (e.g., bus connections, breaker locations, loads information, generator information, one or more operational settings of the electric power delivery system, etc.). In some embodiments, the processor 200 may receive updated data regarding one or more power characteristics of the electric power delivery system 100. For instance, the processor 200 may receive signal(s) from one or more IEDs indicative of voltages and/or currents at various breakers, generators, or loads.

The processor 200 may acquire a list of contingencies that may occur in the power delivery system 100 (block 252). Each contingency in the list may be associated with corresponding control action(s) to maintain operation of the power delivery system 100. For example, each contingency in the list may have expected intelligent electronic device (IED) control action(s) that perform operations (e.g., opening circuit breakers to shed load or shed generation) on the power delivery system 100 in the event of the contingency to change the state of the power delivery system 100 to balance the real power demanded with the real power generated.

To determine whether voltages of the power delivery system are expected to violate one or more operational settings if the contingency were to occur, the contingency may be selected from the list of the contingencies (block 253) and simulated (block 254) using the process described below. That is, the simulated voltages of various buses of the power delivery system 100 may be determined as though the control action(s) have occurred to balance the real power generated and the real power demanded. As explained below, calculating each of the voltages may be based at least in part on the control mode and/or the operating mode of the generators 122, 124, and 126. In other words, the voltages determined in the simulation may depend on how the generators respond to the changes in the state of the power delivery system 100 from the control action(s) and the contingency.

The processor 200 may determine whether the contingency is a load shedding contingency (diamond 256) and/or a generation shedding contingency (diamond 258). If the contingency is a load shedding contingency that includes control action(s) that shed load (diamond 260), the processor 200 may simulate the change in the state of the power delivery system 100 as though the loads have been shed (block 264). Likewise, if the contingency is a generation shedding contingency that includes control action(s) that shed generation (diamond 262), the processor 200 may simulate the change in the state of the power delivery system 100 as though the power generation has been shed (block 266) For example, the monitoring system 200 may include a simulated contingency of a fault occurring on the fifth bus 110. The simulated contingency may be associated with a control action in which circuit breakers 162 and 164 are simulated to be opened to isolate the fault from the power delivery system 100 and to balance real power being generated with real power being demanded. In this example, the simulated control action of opening the circuit breakers 162 and 164 may disconnect the power generators 122, 124, and 126 from load 130 on the power delivery system 100 causing a change in a state of the power delivery system 100. The state of the power delivery system 100 may refer to any connecting or disconnecting of loads and/or power generators in the power delivery system 100, mode change of a generator, and the like. In addition to opening the circuit breakers 162 and 164, further load shedding and/or generation shedding may be simulated to occur due to this change in the state of the power delivery system 100 to balance real power generation with real power demand.

Simulated voltages of each bus in each island in the power delivery system 100 may be determined for the contingency (block 268). For example, the processor 200 may determine voltage changes on each of the buses as set forth according to the techniques disclosed by U.S. patent application Ser. No. 15/644,323, entitled "Microgrid Power Flow Monitoring and Control" and filed on Jul. 7, 2017, which is incorporated by reference herein in its entirety. While the voltages, phase angles, and/or frequency of each of the buses in the power delivery system 100 may be obtained using the techniques described therein, any other suitable method may be used to obtain voltage magnitude, phase angle between the voltage and the current, and/or frequency (block 292) prior to performing the voltage issue analysis (block 298) regarding the predicting voltages described below.

In the simulated contingency, the processor 200 may detect one or more islands (block 270) based on the change in the state of the electric power delivery system 100. As used herein, an island refers to a portion of the power delivery system 100 having a generator 122, 124, or 126 that continues to supply power to one or more loads in that portion while that portion is separated from the remaining power delivery system 100. For example, the processor 200 may detect and identify (e.g., by monitoring power on transmission and/or distribution lines and/or breakers) each island created from the disconnecting of one or more feeders of the system in the simulated state. That is, the number of islands created from the control action may vary depending on the particular contingency being simulated.

A Ybus matrix of each island of the simulated power delivery system 100 may be calculated (block 272). The Ybus matrix may be a matrix of admittances between each bus in the power delivery system 100. The processor 200 may build elements of a jacobian matrix (block 274) of $$\frac{\partial P^{Ref}}{\partial \delta} \text{ and } \frac{\partial P^{Ref}}{\partial |V|}$$

based at least in part on the operating mode (e.g., grid-connected at nominal frequency, grid-connected at off-nominal frequency, or islanded) and/or the control strategy (e.g., droop control, isochronous control, or constant power control, etc.) of the distributed generators 122, 124, and 126 in the simulated contingency. $P^{Ref}$ is the reference power value of the bus, $\delta$ is the voltage phase angle of the bus, and $|V|$ is the magnitude of the voltage of the bus.

A power control mode, such as a generator active power control mode (e.g., droop, isochronous, constant power, etc.) and/or a reactive power control mode (e.g., voltage, MVar, power factor, droop, etc.), of each of the generators 122, 124, and 126 may be received by the processor 200 to account for different responses by the generators 122, 124, 126 expected to occur upon occurrence of the contingency. The processor 200 may create a change in reactive power with respect to a change in phase angle and a change in reactive power with respect to voltage magnitude based on the control mode of the generators 122, 124, and 126. If the generator 122 is operating in voltage control mode (diamond (276) in which the generator 122 operates to maintain the voltage magnitude of one or more buses, the processor 200 may create $$\frac{\partial Q^{Ref}}{\partial \delta} \text{ and } \frac{\partial Q^{Ref}}{\partial |V|}$$

based on the voltage control mode (block 284). $Q^{Ref}$ may refer to the reference reactive power value of the bus. The processor 200 may determine whether the generator 122 is operating in an MVar control mode (diamond 278) in which the generator 122 operates to produce a fixed amount of reactive power such that the reactive power output is set at a known reference quantity on one or more buses on the power distribution system 100. If the generator is operating in the MVar control mode, the processor may create $$\frac{\partial Q^{Ref}}{\partial \delta} \text{ and } \frac{\partial Q^{Ref}}{\partial |V|}$$

based on the MVar control strategy (block 286). Similarly, if the generator 122 is operating in PF control mode (diamond 280) in which the generator 122 operates to produce power to maintain a power factor of the power distribution system 100, the processor 200 may generate $$\frac{\partial Q^{Ref}}{\partial \delta} \text{ and } \frac{\partial Q^{Ref}}{\partial |V|}$$

based on the PF control strategy (block 288). Further, if the generator is operating in voltage droop control mode (diamond 282), the processor 200 may generate $$\frac{\partial Q^{Ref}}{\partial \delta} \text{ and } \frac{\partial Q^{Ref}}{\partial |V|}$$

based on the voltage droop control strategy (block 290).

For example, if the generator 122 is operating in a droop control mode in which the load is shared, if a circuit breaker trips and decreases the load, the generators 122, 124, and 126 may be simulated to adjust to the decreased load proportionally. If generator 122 is operating in isochronous mode, the jacobian matrix may be created in which power output by the generator 122 is expected to be adjusted to maintain the frequency of the electric power delivery system 100 based on the decreased load independently of the other generators 124 and 126.

In some embodiments, the processor 200 may determine power flow characteristics, such as the voltage, the phase angle, the frequency, etc., of each of the buses in the electric power delivery system based on the operational limitations of the generator. For example, if a generator at a particular bus has certain power output limitations, the processor 200 may limit the power flow characteristics at that bus based on such limitations. By limiting the power flow characteristics of the electric power delivery system to be consistent with generator limitations, the processor 200 may determine the power flow characteristics without use of a slack bus. A slack bus may refer to a bus that is unconstrained to real and reactive power limitations that is used in power flow analysis to balance active power and/or reactive power. By removing the slack bus and constraining analysis based on the operational characteristics of the electric power delivery system, the processor 200 may accurately simulate the power flow characteristics if a contingency were to occur.

One technique to determine $$\frac{\partial Q^{Ref}}{\partial \delta} \text{ and } \frac{\partial Q^{Ref}}{\partial |V|}$$

is described below, however, this technique is simply meant to be illustrative and various other techniques may be used.

$$\frac{\partial Q^{Ref}}{\partial \delta}$$

may be determined using equations 1 and 2 below:
If n≠i, then $$\frac{\partial Q_i^{Ref}}{\partial \delta_n} = -|Y_{in}||V_i||V_n|\cos(\delta_i - \delta_n - \theta_{in}) \qquad \text{Eq. 1}$$

If n=i, then $$\frac{\partial Q_i^{Ref}}{\partial \delta_i} = \sum_{k=1}^{N} |Y_{ik}||V_i||V_k|\cos(\delta_i - \delta_k - \theta_{ik}) \qquad \text{Eq. 2}$$

where $Q_i^{Ref}$ is the reactive power generation reference value at bus I, $\delta$ is the bus voltage phase angle, $|Y_{in}|$ is the magnitude of the element located at row i and column n of Y Bus matrix, $|V_i|$ is the bus voltage magnitude at bus i, $|V_n|$ is bus voltage magnitude at bus n, $\delta_i$ is bus voltage angle at bus i, $\delta_n$ is bus voltage angle at bus n, and $\theta_{in}$ is the angle of the element located at row i and column n of Y bus matrix.

$$\frac{\partial Q^{Ref}}{\partial |V|}$$

may be determined using equations 3 and 4 below:
If n≠i, then $$\frac{\partial Q_i^{Ref}}{\partial |V_n|} = |Y_{in}||V_i|\sin(\delta_i - \delta_n - \theta_{in}) \qquad \text{Eq. 3}$$

If n=i, then $$\frac{\partial Q_i^{Ref}}{\partial |V|_i} = \frac{\partial g_i^q(V_i) * Q_{Load\_i}^N}{\partial |V|_i} - |Y_{ii}||V_i|\sin(\theta_{ii}) + \sum_{k=1}^{N} |Y_{ik}||V_k|\cos(\delta_i - \delta_k - \theta_{ik})$$

Eq. 4 where $g_i^q(V)$ indicates the effects of voltage on reactive power load I and $Q_{Load\_i}^N$ is the reactive power load i at nominal voltage.

Once the derivatives are obtained, voltage angle, and voltage magnitude differences from previous iterations may be obtained using equation (5) below:

$$\begin{bmatrix} \Delta X \\ \Delta \delta \\ \Delta |V| \end{bmatrix} = \begin{bmatrix} \gamma & \frac{\partial P^{Ref}}{\partial \delta} & \frac{\partial P^{Ref}}{\partial |V|} \\ 0 & \frac{\partial Q^{Ref}}{\partial \delta} & \frac{\partial Q^{Ref}}{\partial |V|} \end{bmatrix}^{-1} \begin{bmatrix} \Delta P^{Ref} \\ \Delta Q^{Ref} \end{bmatrix}$$

Eq. 5

The updated voltage angle and voltage magnitude may be:

$$\begin{bmatrix} \delta^t \\ |V|^t \end{bmatrix} = \begin{bmatrix} \Delta \delta \\ \Delta |V| \end{bmatrix} + \begin{bmatrix} \delta^{t-1} \\ |V|^{t-1} \end{bmatrix}$$

Eq. 6 where t is the iteration number.

The processor 200 may update the voltage, phase angle, and/or frequency of the system (block 292). The processor 200 may then determine whether to perform another iteration of the YBus and jacobian matrix of the island based on whether changes in x, referred to as the Euclidean normal, changes in voltage, and/or changes in the angle exceed a desired threshold (block 294). A change that falls below a preset threshold ε may indicate that the determined voltages are of a desired accuracy. Further, the processor 200 may perform another iteration if the voltages, phase angles, and/or frequencies of the system resulted in a changed generation mode. The processor 200 may perform the steps 272-296 for each island in the simulated power delivery system.

Upon determining the predicted voltages of each bus, the processor 200 may determine whether any voltage issues are present based on the predicted bus voltages (diamond 298). Voltage issues, as used herein, may refer to a voltage that is predicted to violate one or more operational settings of the power delivery system 100 in the simulated contingency. For example, it may be desired to maintain a voltage of a bus above a certain threshold level. The processor 200 may compare the predicted voltage of each bus to one or more respective operational settings to determine whether the contingency has any voltage issues. If the contingency does not appear to have voltage issues, the processor 200 may begin the process again for the next contingency (diamond 316). In certain simulated contingencies, one or more buses may be expected to decrease below the respective threshold level.

The processor 200 may determine whether a voltage collapse is expected on one or more buses of the power delivery system 100 if the simulated contingency were to occur (diamond 300). For example, a voltage collapse may refer to where a voltage on one or more buses decreases substantially (e.g., greater than 50%, greater than 80%, greater than 90%, or more) due to excess reactive power demand on the power grid. If the predicted voltage is expected to collapse, the processor 200 may provide a voltage collapse alarm (block 306) indicating that a voltage collapse is expected to occur if the contingency occurs on the power delivery system 100.

Similarly, the processor 200 may determine whether a voltage protection trip is expected on one or more buses of the power delivery system 100 if the simulated contingency were to occur (diamond 302). For example, if the power delivery system 100 includes an IED that opens a circuit breaker when the voltage on a bus falls below a threshold, the processor 200 may issue a voltage protection alarm (block 308) and provide a bus location and the voltage that violates the protection settings if the simulated voltage of the bus is expected to open the circuit breaker (block 312).

Likewise, the processor 200 may determine whether the voltage violates one or more operating limits of the power delivery system 100 (diamond 304). For example, if a bus is designed to operate between a certain range and the contingency is expected to cause a change in the state of the power delivery system 100 such that the voltage exceeds or falls below the range, the processor 200 may provide a voltage operating limit violation alarm (block 310). Further, the processor 200 may provide the bus location and the voltage that violate the operating limits (block 314).

In some embodiments, the operational settings, such as the voltage thresholds associated with voltage collapse, voltage thresholds that cause voltage protections to trip, and/or voltage operating limits may be defined (e.g., via the input structures 208) and stored in the memory 202 of the monitoring system 182. These settings may be general settings with respect to the power delivery system 100 or particular settings for a particular bus or set of buses. By determining voltages of each bus on the power delivery system 100 for each contingency, the power delivery system 100 may be protected if reactive power being delivered is not predicted to meet the reactive power being demanded due to the contingency occurring. Upon predicting the voltages of each bus of the contingency, the processor 200 may determine whether there is another contingency in the list to simulate (diamond 316). If there is additional contingencies to be simulated, the processor 200 may begin the process again at block 253. Upon completing the predictions of voltages for each contingency, the processor 200 may provide the results on the display 206 of the monitoring system 182 (block 318).

Figure 4:
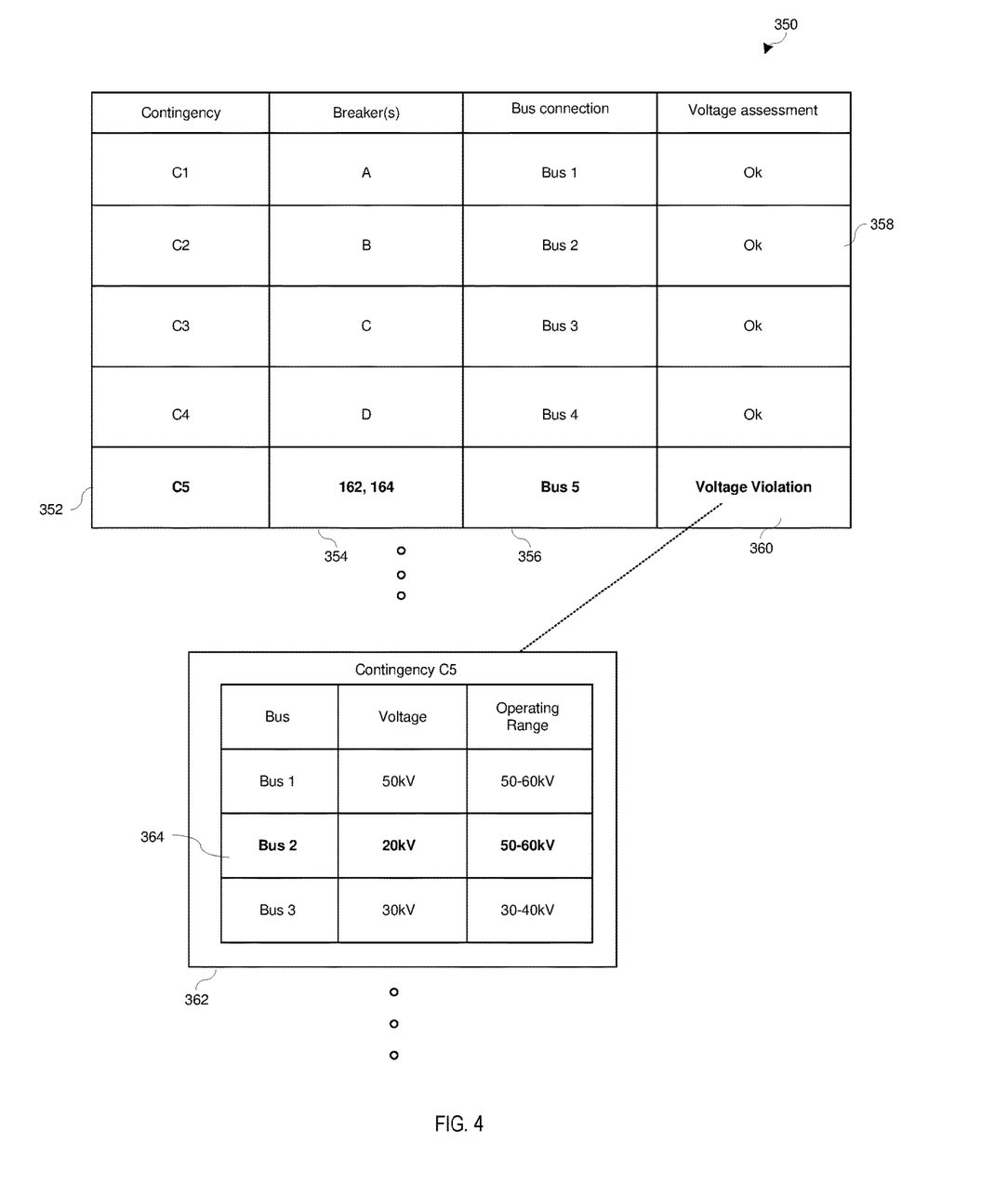
FIG. 4 is a screenshot of a display of the monitoring system of FIG. 2, in accordance with an embodiment.

FIG. 4 is a screenshot of a table of results from the simulation that may be presented on the display 206 of the monitoring system 182. In the illustrated embodiment, the table 350 of the results includes the list of contingencies 352, the control actions 354 associated with each contingency, and the bus connections 356 affected by the control actions. Further, the table 350 includes a voltage assessment prediction of each contingency in the list of contingencies from the simulation performed in the discussion with respect to FIGS. 3A and 3B. That is, if predicted voltages of each bus are determined to be within the operational settings, the processor 200 may provide an approval 358 of the contingency to the user on the display 206. If a predicted voltage of any of the buses exceeds the operational settings of the power delivery system 100, the processor 200 may provide an indication (e.g., voltage violation cell 360) that the predicted voltage violates the one or more operational settings on the display 206. For example, the row of the contingency that includes a voltage that violates one or more settings may be highlighted, have differing fonts, or the like, to indicate to the user that the particular contingency includes a voltage violation. Note that while this screenshot is shown to include certain information, this is simply meant to be illustrative, and any suitable display of the results of the prediction assessment may be used. For example, the table 350 may include additional information, such as present power, capability, incremental reserve margin (e.g., setpoint and/or actual), available power, available capacity, measured load, load to shed (e.g., required and/or selected), current breaker status, or the like. In other embodiments, the display 206 may simply display a notification that a voltage is predicted to violate one or more operational settings of the power delivery system.

The processor 200 may receive an input indicating selection of the voltage violation cell 360. Upon selection of the voltage violation cell 360, the processor 200 may display a pop-up 362 on the display 206 to present a voltage profile of each voltage of each bus in the simulated contingency. Further, the voltage profile may include an indication of any buses that exceed operating limits. For example, row 364 may be highlighted to indicate that the voltage on bus 2 is predicted to fall below the desired operating range to allow an operator to address the voltage issue to improve operation of the electric power delivery system 100 if the contingency were to occur, thereby reducing the likelihood of an outage occurring.

The systems and methods described above may improve power monitoring technology by determining whether one or more contingencies of the power delivery system may cause voltage issues. By detecting potential voltage issues if a contingency were to occur, the systems and methods may reduce outages caused by differences in reactive power demand and supply. Additionally, by providing an indication that the voltage violates the one or more operational settings on a display of the monitoring system, operators may make decisions that account for reactive power. Further, by providing a voltage profile of each voltage on each bus in the simulated contingency, operators may determine the cause of the voltage issue and plan actions to address voltage issue of the power delivery system to reduce outages.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer readable medium comprising instructions that, when executed by a processor of an electronic device, cause the processor to:
    acquire at least one contingency of an electric power delivery system;
    acquire one or more intelligent electronic device (IED) control actions associated with the at least one contingency;
    predict a voltage of at least one bus of the electric power delivery system by simulating of the one or more IED control actions associated with the at least one contingency;
    determine that the voltage of the at least one bus is predicted to violate one or more operational settings of the electric power delivery system if the at least one contingency were to occur; and
    provide an indication that the voltage violates the one or more operational settings on a display of the electronic device.

2. The non-transitory, computer readable medium of claim 1, comprising instructions that, when executed by the processor, cause the processor to predict the voltage of the at least one bus based on the generator active power mode, a reactive power control mode, or both.

3. The non-transitory, computer readable medium of claim 1, comprising instructions that, when executed by the processor, cause the processor to predict the voltage of the at least one bus based at least in part on expected control actions from the one or more IEDs of the electric power delivery system.

4. The non-transitory, computer readable medium of claim 1, comprising instructions that, when executed by the processor, cause the processor to predict the voltage of the at least one bus by simulating the at least one contingency according to generator capacity limitations of one or more generators in the electric power delivery system to avoid the existence of a slack bus in the voltage assessment.

5. The non-transitory, computer readable medium of claim 1, comprising instructions that, when executed by the processor, cause the processor to predict the voltage of the at least one bus based on load frequency and voltage dependency.

6. The non-transitory, computer readable medium of claim 1, comprising instructions that, when executed by the processor, cause the processor to display a table comprising the at least one contingency and the indication that the voltage violates the one or more operational settings.

7. The non-transitory, computer readable medium of claim 6, comprising instructions that, when executed by the processor, cause the processor to:
    receive a selection of at least one cell in the table; and
    upon receiving the selection of the at least one cell, provide a pop-up comprising voltages at each bus of the electric power delivery system associated with the contingency.

8. The non-transitory, computer readable medium of claim 7, comprising instructions that, when executed by the processor, cause the processor to display, in the pop-up, an indication that the voltage of the at least one bus is predicted to violate the one or more operational settings.

9. The non-transitory, computer readable medium of claim 1, wherein the one or more IED control actions comprise shedding load, shedding generation, or both, on the electric power delivery system.

10. The non-transitory, computer readable medium of claim 9, comprising instructions that, when executed by the processor, cause the processor to simulate opening a circuit breaker to shed the load, shed the generation, or both.

11. The non-transitory, computer readable medium of claim 1, comprising instructions that, when executed by the processor, cause the processor to:

generate a Ybus matrix of the electric power delivery system;
generate a jacobian matrix of the electric power delivery system;
determine $$\frac{\partial Q^{Ref}}{\partial \delta} \text{ and } \frac{\partial Q^{Ref}}{\partial |V|}$$

of each bus of the at least in bus on the electric power delivery system based on the control mode of one or more electric generators of the electric power delivery system, where $Q^{Ref}$ is a reference reactive power of the electric power delivery system, δ is a voltage phase angle of each bus, and |V| is a voltage magnitude of each bus; and
updating the voltage of the at least one bus based on the determined $$\frac{\partial Q^{Ref}}{\partial \delta} \text{ and } \frac{\partial Q^{Ref}}{\partial |V|}.$$

12. A method, comprising:
acquiring, via a processor of a monitoring system, at least one contingency associated with an electric power delivery system;
acquiring one or more expected control actions that one or more controllers of the electric power delivery system are expected to perform if the contingency occurs, wherein the one or more expected control actions comprise shedding load, shedding generation, or both;
determining, via the processor, a voltage of at least one bus in the electric power delivery system by simulating the one or more expected control actions of the at least one contingency, wherein the voltage is determined based at least in part on a power mode of at least one generator of the electric power delivery system;
determining, via the processor, that a voltage of at least one bus violates an operational setting of the electric power delivery system; and
providing, via the processor, an indication that the voltage of the at least one bus violates the operational setting on a display of a monitoring system.

13. The method of claim 12, wherein the power mode comprises a generator active power mode comprising at least one of a droop mode, an isochronous mode, and a constant power mode.

14. The method of claim 12, wherein the power mode comprises a reactive power control mode comprising at least one of a voltage mode, an MVar mode, a power factor mode, and a voltage droop mode.

15. The method of claim 12, comprising determining the voltage of the at least one bus based at least in part on generator capacity limitations of the at least one generator to avoid use of a slack bus in assessing the voltage.

16. The method of claim 12, comprising determining the voltage of the at least one bus based at least in part on load frequency and voltage dependency of the at least one bus in the electric power delivery system.

17. The method of claim 12, comprising comparing, for each contingency of the plurality of contingencies, the voltage of each bus of the plurality of buses to respective operating limits associated with the respective bus.

18. The method of claim 12, comprising automatically simulating the change in the state of the electric power delivery system periodically based on updated power conditions of the electric power delivery system.

19. An electronic device, comprising:
a memory;
a processor operatively coupled to the memory, wherein the processor is configured to execute instructions stored on the memory to cause the processor to:
acquire at least one contingency of an electric power delivery system;
simulate the occurrence of the at least one contingency;
generate a Ybus matrix of the electric power delivery system;
generate a Jacobian matrix of the electric power delivery system;
determine $$\frac{\partial Q^{Ref}}{\partial \delta} \text{ and } \frac{\partial Q^{Ref}}{\partial |V|}$$

of each bus on the electric power delivery system based on the control mode of one or more electric generators of the electric power delivery system, where $Q^{Ref}$ is a reference reactive power of the electric power delivery system, δ is a voltage phase angle of each bus, and |V| is a voltage magnitude of each bus; and
predict a voltage of the at least one bus if the at least one contingency were to occur based on the determined $$\frac{\partial Q^{Ref}}{\partial \delta} \text{ and } \frac{\partial Q^{Ref}}{\partial |V|},$$

provide an indication that the voltage predicted violates one or more operational settings associated with operation of the electric power delivery system.

20. The electronic device of claim 19, wherein the processor is configured execute instructions stored in the memory to cause the processor to determine that the voltage is predicted to violate the one or more operational settings when the voltage exceeds or falls below a voltage operating limit of the at least one bus.

21. The electronic device of claim 19, wherein the processor is configured execute instructions stored in the memory to cause the processor to determine that the voltage is predicted to violate the one or more operational settings when the voltage is predicted to collapse on the at least one bus.

22. The electronic device of claim 19, wherein the processor is configured execute instructions stored in the memory to cause the processor to determine that the voltage is predicted to violate one or more operational settings when the voltage is predicted to violate a protection setting of the at least one bus.

23. An electronic device, comprising:
a memory; and
a processor operatively coupled to the memory, wherein the processor is configured to:
acquire at least one contingency of an electric power delivery system, wherein the at least one contingency is associated with one or more intelligent electronic device (IED) control actions that cause a change in a state of the electric power delivery system;

determine a predicted reactive power being generated, a predicted reactive power being delivered, or both, in the electric power delivery system by simulating the at least one contingency and the associated IED control actions, wherein the predicted reactive power being delivered, the predicted reactive power being generated, or both, is based at least in part on a control mode of one or more electric generators of the electric power delivery system;

predict one or more characteristics of the electric power delivery system if the state were to change due to the at least one contingency occurring, provide the one or more characteristics on a display of the electronic device.

24. The electronic device of claim 23, wherein the one or more characteristics comprise a voltage of each bus in the electric power delivery system.

25. A method, comprising:

acquire at least one contingency of an electric power delivery system, wherein the at least one contingency is associated with one or more intelligent electronic device (IED) control actions that cause a change in a state of the electric power delivery system;

determine a change in reactive power on at least one bus in the electric power delivery system by simulating the change in the state of the electric power delivery based at least in part on a control mode of one or more generators of the electric power delivery system;

determine whether the change in reactive power results in a violation of one or more operational settings of the electric power delivery system;

provide an indication of the violation on a display.

\* \* \* \* \*